US012608910B2

(12) United States Patent
Zhang et al.

(10) Patent No.: US 12,608,910 B2
(45) Date of Patent: Apr. 21, 2026

(54) METHOD AND DEVICE FOR DETECTING STANDARDIZATION OF WEARING MASK

(71) Applicant: ZHEJIANG DAHUA TECHNOLOGY CO., LTD., Hangzhou (CN)

(72) Inventors: Xingming Zhang, Hangzhou (CN); Jingsong Hao, Hangzhou (CN); Shulei Zhu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 359 days.

(21) Appl. No.: 18/242,015

(22) Filed: Sep. 5, 2023

(65) Prior Publication Data

US 2023/0410468 A1    Dec. 21, 2023

Related U.S. Application Data

(63) Continuation of application No. PCT/CN2022/100917, filed on Jun. 23, 2022.

(30) Foreign Application Priority Data

Jun. 25, 2021    (CN) .......................... 202110708987.2

(51) Int. Cl.
*G06V 10/75* (2022.01)
*G06V 10/774* (2022.01)
(Continued)

(52) U.S. Cl.
CPC .......... *G06V 10/751* (2022.01); *G06V 10/759* (2022.01); *G06V 10/774* (2022.01);
(Continued)

(58) Field of Classification Search
CPC .. G06V 10/751; G06V 10/759; G06V 10/774; G06V 10/776; G06V 10/95;
(Continued)

(56) References Cited

U.S. PATENT DOCUMENTS 12,080,098 B2 * 9/2024 Zeng .................... G06V 40/169
2020/0134313 A1    4/2020 Endoh et al.
(Continued)

FOREIGN PATENT DOCUMENTS

CN      106407904 A      2/2017
CN      110223052 A      9/2019
(Continued)

OTHER PUBLICATIONS

International Search Report and Written Opinion, International Application No. PCT/CN2022/100917, mailed Aug. 31, 2022 (10 pages).
(Continued)

*Primary Examiner* — Wesley J Tucker

(57) ABSTRACT

The method includes: receiving an image to be detected, wherein the image to be detected includes an object to be detected; detecting the image to be detected based on a trained multi-task network model to obtain a region where the object wears a mask; comparing an area of the region where the object wears the mask to a predetermined threshold to determine a first detection result; in response to the object being determined as wearing the mask, determining comparison information of a mask area to be compared, and determining a target region in the image to be detected corresponding to the comparison information based on a face feature point template; and obtaining a second detection result based on an overlapping degree between the target region and the region where the object wears the mask.

10 Claims, 3 Drawing Sheets

(51) Int. Cl.

| | |
|---|---|
| *G06V 10/776* | (2022.01) |
| *G06V 10/94* | (2022.01) |
| *G06V 40/16* | (2022.01) |

(52) U.S. Cl.
CPC ............ *G06V 10/776* (2022.01); *G06V 10/95* (2022.01); *G06V 40/165* (2022.01); *G06V 40/171* (2022.01); *G06V 10/945* (2022.01)

(58) Field of Classification Search
CPC .. G06V 40/165; G06V 40/171; G06V 10/945; G06V 20/52; G06V 40/168; G06V 40/172; G06V 10/82; G06N 3/0895; G06F 18/22
See application file for complete search history.

(56) References Cited

U.S. PATENT DOCUMENTS

| | | | |
|---|---|---|---|
| 2021/0117649 A1* | 4/2021 | Gonzalez Aguirre ...................... | G06V 10/758 |
| 2021/0192180 A1 | 6/2021 | Wang et al. | |
| 2021/0326579 A1* | 10/2021 | Harris .................. | G06V 40/171 |
| 2021/0374468 A1* | 12/2021 | Chandraker ......... | G06N 3/0464 |
| 2022/0012894 A1* | 1/2022 | Lev ......................... | G06T 7/136 |
| 2022/0019766 A1* | 1/2022 | Vardimon ................ | G06N 3/08 |
| 2022/0036678 A1* | 2/2022 | Parekh ..................... | G07C 9/25 |
| 2022/0068109 A1* | 3/2022 | Zeng .................... | G06V 40/165 |
| 2022/0100989 A1* | 3/2022 | Zhu ....................... | G06F 21/602 |
| 2022/0101290 A1* | 3/2022 | Handshaw ............. | G16H 40/63 |
| 2022/0230492 A1* | 7/2022 | Byrappa ................ | G06V 20/40 |
| 2023/0135400 A1* | 5/2023 | Zhai ..................... | G06V 40/171 382/118 |
| 2023/0351802 A1* | 11/2023 | Hashimoto .......... | G06V 10/774 |
| 2025/0046123 A1* | 2/2025 | Imai .................... | G06V 40/172 |

FOREIGN PATENT DOCUMENTS

| | | | |
|---|---|---|---|
| CN | 111428559 | A | 7/2020 |
| CN | 111753636 | A | 10/2020 |
| CN | 111881770 | A | 11/2020 |
| CN | 112115818 | A | 12/2020 |
| CN | 112183471 | A | 1/2021 |
| CN | 112287827 | A | 1/2021 |
| CN | 112329516 | A | 2/2021 |
| CN | 112347988 | A | 2/2021 |
| CN | 112434562 | A | 3/2021 |
| CN | 112434578 | A | 3/2021 |
| CN | 112488647 | A | 3/2021 |
| CN | 112580572 | A | 3/2021 |
| CN | 112686214 | A | 4/2021 |
| CN | 112906651 | A | 6/2021 |
| CN | 113420675 | A | 9/2021 |
| WO | 2017149315 | A1 | 9/2017 |
| WO | 2021084564 | A1 | 5/2021 |

OTHER PUBLICATIONS

Chinese First Office Action,Chinese Patent Application No. 202110708987.2, mailed Jun. 30, 2022 (20 pages).

Chinese Second Office Action,Chinese Patent Application No. 202110708987.2, mailed Apr. 10, 2023 (17 pages).

Chinese Rejection decision,Chinese Patent Application No. 202110708987.2,mailed Jun. 29, 2023 (15 pages).

Multi-Stage CNN Architecture for Face Mask Detection,dated Apr. 2, 2021 (8 pages).

European Search Report,European Patent Application No. 22827674.7, mailed Apr. 19, 2024 (67 pages).

* cited by examiner an image to be detected is received, and the image to be detected includes an object to be detected.     201 the image to be detected is detected based on a trained multi-task network model to obtain a region where the object wears a mask; an area of the region where the object wears the mask is compared to a predetermined threshold to determine a first detection result; and the first detection result is that the object is wearing the mask or the object is not wearing the mask.     202 when it is determined that the object is wearing the mask, comparison information of a mask area to be compared is determined, and a target region corresponding to the comparison information in the image to be detected is determined based on a face feature point template. The comparison information represents information of a comparison region to be detected when the standardization of the mask wearing is performed. The face feature point template is determined based on the face region of the object.     203 a second detection result is obtained based on the overlapping degree between the target region and the region where the object is wearing the mask. The second detection result includes the mask being worn non-standardly and the mask being worn standardly.     204

FIG. 2

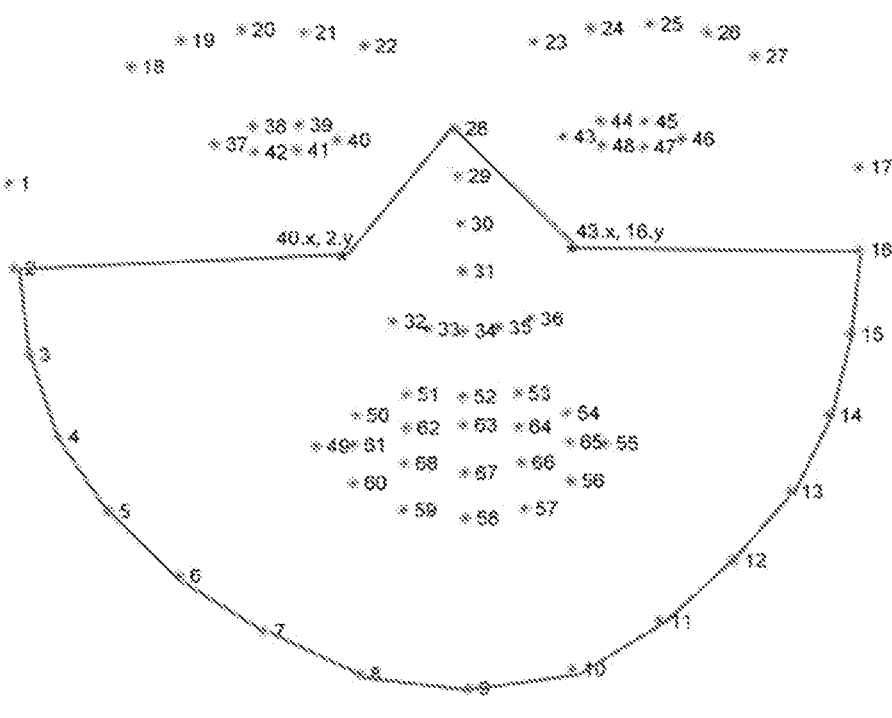

FIG. 3

METHOD AND DEVICE FOR DETECTING STANDARDIZATION OF WEARING MASK

CROSS REFERENCE TO RELATED APPLICATIONS

The present application is a continuation application of the international patent application No. PCT/CN2022/100917, filed on Jun. 23, 2022, which claims priority of Patent Application No. 202110708987.2, filed on Jun. 25, 2021, in China National Intellectual Property Administration, the entire contents of which are hereby incorporated by reference in their entireties.

TECHNICAL FIELD

The present disclosure relates to the field of image processing, and in particular to a method and a device for detecting standardization of wearing a mask.

BACKGROUND

Currently, wearing a mask is a significant way to prevent disease transmission. For example, wearing a mask may facilitate organizations to manage outbreaks of diseases to reduce a risk of transmission. Therefore, it is important to detect whether people are wearing masks and whether people are wearing the masks properly.

In the art, while detecting mask wearing, a face is detected firstly, and subsequently, it is determined whether a target person is wearing a mask. However, a system in the art involves a cascade of various stages, such as detection, classification, and the like. In overall, the system is time-consuming and is not adapted to various wearing standard detection requirements.

SUMMARY OF THE DISCLOSURE

The present disclosure provides a method and a device for detecting standardization of wearing a mask, improving detection accuracy of the standardization of mask wearing.

According to a first aspect, a method for detecting standardization of mask wearing includes following operations.

An image to be detected is received, wherein the image to be detected comprises an object to be detected.

The image to be detected is detected based on a trained multi-task network model to obtain a region where the object wears a mask. An area of the region where the object wears the mask is compared to a predetermined threshold to determine a first detection result, wherein the first detection result is that the object is wearing the mask or that the object is not wearing the mask.

In response to the object being determined as wearing the mask, comparison information of a mask area to be compared is determined, and a target region in the image to be detected corresponding to the comparison information is determined based on a face feature point template, wherein the comparison information represents information of a comparison portion to be detected when standardization of mask wearing is detected, and the face feature point template is determined based on a face region of the object to be detected.

A second detection result is obtained based on an overlapping degree between the target region and the region where the object wears the mask, wherein the second detection result includes the mask being worn standardly and the mask being worn non-standardly.

According to a second aspect, an apparatus for detecting standardization of mask wearing includes following components.

A receiving unit is configured to receive an image to be detected, wherein the image to be detected comprises an object to be detected.

A first processing unit is configured to detect the image to be detected based on a trained multi-task network model to obtain a region where the object wears a mask; and to compare an area of the region where the object wears the mask to a predetermined threshold to determine a first detection result, wherein the first detection result is that the object is wearing the mask or that the object is not wearing the mask.

A second processing unit is configured to determining comparison information of a mask area to be compared in response to the object being determined as wearing the mask, and determining a target region in the image to be detected corresponding to the comparison information based on a face feature point template, wherein the comparison information represents information of a comparison portion to be detected when standardization of mask wearing is detected, and the face feature point template is determined based on a face region of the object to be detected.

An obtaining unit is configured to obtain a second detection result based on an overlapping degree between the target region and the region where the object wears the mask, wherein the second detection result includes the mask being worn standardly and the mask being worn non-standardly.

According to a third aspect, a computer device including following components.

A memory is configured to store program instructions.

A processor is configured to invoke the computer instructions stored in the memory and perform the operations of any method of the first aspect according to the program instructions.

According to a fourth aspect, a computer-readable storage medium has computer programs stored therein. The computer programs, when being executed by a processor, are configured to perform the operations of any method of the first aspect.

According to a fifth aspect, a computer program product. When the computer program product is run by a computer device, the computer program product causes the computer device to perform the operations of any method of the first aspect.

BRIEF DESCRIPTION OF THE DRAWINGS

The accompanying drawings herein are incorporated into and form a part of the specification. The drawings illustrate embodiments consistent with the present disclosure, and explain principles of the present disclosure by referring to the specification. The drawings and the specification do not limit the scope of the present disclosure.

FIG. 2 is a flow chart of a method for detecting standardization of mask wearing according to an embodiment of the present disclosure.

FIG. 3 is a schematic view of a target region according to an embodiment of the present disclosure.

DETAILED DESCRIPTION

Figure 1:
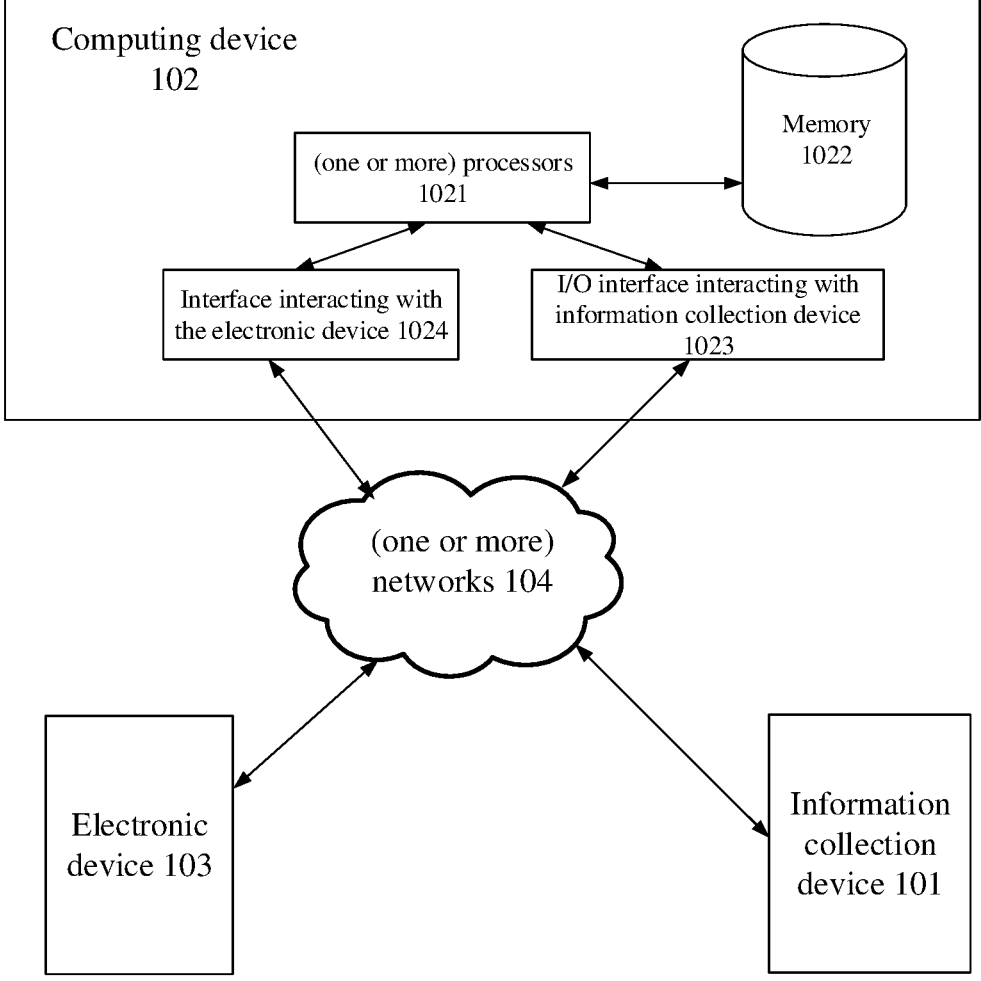
FIG. 1 is a schematic view of an application scenario in an embodiment of the present disclosure.

In order to illustrate objectives, technical solutions and advantages of the present disclosure more clearly, the technical solutions in the embodiments of the present disclosure will be clearly and completely described below by referring to the accompanying drawings in the embodiments of the present disclosure. Obviously, the described embodiments are only a part, but not all, of the embodiments of the present disclosure. All other embodiments obtained by an ordinary skilled person in the art based on the embodiments in the present disclosure without making creative work shall fall within the scope of the present disclosure. The embodiments in the present disclosure and the features thereof can be combined with each other at will without conflict. Further, although a logical sequence is shown in a flow chart, in some cases, operations shown or described may be performed in a sequence different from that shown in the flow chart.

The terms "first" and "second" in the specification and claims of the present disclosure and in the above-mentioned drawings are used to distinguish different objects, but do not indicate a particular order. In addition, the term "including" and any variation thereof shall be interpreted as non-exclusive inclusion. For example, a process, a method, a system, a product, or an apparatus including a series of operations or units is not limited to the listed operations or units, but may alternatively include operations or units not listed, or alternatively include other operations or units inherent to the process, the method, the product, or the apparatus.

As stated in the above, in the art, when detecting mask wearing, the entire detection process is time-consuming, and the detection accuracy is relatively poor.

Therefore, the present disclosure provides a method for detecting standardization of mask wearing. According to the method, the detection of whether a mask is worn may be achieved by a multi-task network model. A target region may be determined correspondingly based on comparison information. In this way, it is determined whether the mask is worn standardly based on an overlapping degree between the target region and a region where an object wears the mask. That is, the mask worn by the object may be detected quickly and accurately.

Now that the invention concept of the embodiments are introduced, an application scenario in which the technical solutions in the embodiments of the present disclosure may apply will be illustrated in brief. To be noted that the application scenario described in the embodiments of the present disclosure are intended to illustrate the technical solutions of the embodiments of the present disclosure more clearly, and does not limit the technical solutions provided by the embodiments of the present disclosure. The ordinary skilled person in the art shall understand that, as a new application scenario occurs, the technical solutions provided by embodiments of the present disclosure shall be equally applicable to similar technical problems.

As shown in FIG. 1, FIG. 1 is an application scenario in which an embodiment of the present disclosure may be applied. The application scenario includes information collection device 101, a computing device 102, and other electronic devices 103. The method for detecting standardization of mask wearing in the embodiments of the present disclosure can be achieved by the information collection device 101 and the computing device 102 in FIG. 1 cooperatively. Further, by combining other electronic devices, statistics and processing may be performed on a situation of people wearing masks.

While performing the method, the above-mentioned information collection device 101 may obtain video stream information, and the video stream information includes a plurality of persons. After the information collection device 101 collects data corresponding to the plurality of persons, the data may be sent to the computing device 102 via a network 104. For example, the information collection device 101 may be located at various locations, such as a cross road, a shopping center, a station, an airport, and so on.

The computing device 102 may include one or more processors 1021, a memory 1022, an I/O interface 1023 interacting with the information collection device 101, and an I/O interface 1024 interacting with an access control device 103, and the like. In an implementation, a plurality of computing devices 102 may be configured to interact with a plurality of information collection devices 101. Alternatively, one computing device 102 may be configured to interact with a plurality of information collection devices 101. Alternatively, one computing device 102 may be configured to interact with one information collection device 101. The present disclosure does not limit the number of the devices. In detail, the computing device 102 may be connected to other electronic devices 103 to provide feedback of detection data about mask wearing to the electronic devices. In FIG. 1, one computing device 102 interacting with one information collection device 101 and one electronic device 103 is taken as an example.

In the present embodiment, the computing device 102 receives data sent by the information collection device 101 through the I/O interface 1023. Further, a processor 1021 is configured to process the data. The processed information is stored in the memory 1022. Of course, the computing device may send the processed information to the electronic device 103 through the interface 1024.

The information collection device 101 may be communicatively connected to the computing device 102 via one or more networks 104. The electronic device 103 may be communicatively connected to the computing device 102 via one or more networks 104. Each of the one or more network 104 may be a wired network or a wireless network. For example, the wireless network may be a mobile cellular network, a wireless fidelity (Wi-Fi) network, or other networks, which will not be limited by the present disclosure.

In an implementation, after the computing device 102 receives data of people wearing masks or not wearing masks, the computing device 102 may process the data to determine whether the people are wearing masks and whether the masks are worn standardly, obtaining a detection result. The computing device 102 provides data corresponding to the detection result to the electronic device 103. In this way, statistics about the people wearing masks and subsequent processing of the data may be achieved.

To further illustrate the method for detecting the standardization of mask wearing of the embodiments of the present disclosure, the present disclosure will be described in detail below by referring to the accompanying drawings and specific embodiments. Although embodiments of the present disclosure provide the operations of the method as shown in the following embodiments or the accompanying drawings, more or fewer operations may be included in the method based on convention or without creative work. Some operations do not have logical relationships, and an order of performing these operations is not limited to an order of provided by the embodiments of the present disclosure.

While performing the method in an actual processing or while the device performing the method, the operations may be performed based on an order shown in the embodiments or in the flow chart, or may be performed in parallel (for example, in an application scenario where parallel processors are configured or multiprocessing is applied).

The method for detecting the standardization of mask wearing in the embodiments of the present disclosure is described below by referring to the flow chart shown in FIG. 2. The operations shown in FIG. 2 may be performed by the computing device shown in FIG. 1. In an implementation, the computing device may be a server, such as a personal computer, a medium or large computer, a computer cluster, and the like.

In an operation 5201, an image to be detected is received, and the image to be detected includes an object to be detected.

In the embodiments of the present disclosure, the image to be detected may be received. The information collection device may perform a frame-splitting process on a captured video stream to determine a frame image, and the frame image may be the image to be detected. Alternatively, the image to be detected may be an image sent by the information collection device. The present disclosure does not limit a means to determine the image to be detected.

In an operation 5202, the image to be detected is detected based on a trained multi-task network model to obtain a region where the object wears a mask; an area of the region where the object wears the mask is compared to a predetermined threshold to determine a first detection result; and the first detection result is that the object is wearing the mask or the object is not wearing the mask.

In the embodiments of the present disclosure, following operations may be performed to train a predetermined multi-task network model. The training is not limited to the following operations.

In an operation a, a sample image to be trained is determined. The sample image correspondingly includes information about a detection frame of a marked face, information about a feature point of the marked face, information about a region where a marked object wears the mask, or information about whether the marked object is wearing the mask.

To be noted that, in the embodiments of the present disclosure, in order to meet the requirements of detecting standardization of mask wearing in various scenarios, any situation that the mask appears in a face region may be marked as the object is wearing the mask.

In an operation b, the sample image may be detected based on a predetermined multi-task management model to obtain a detection frame of a to-be-detected face. The detection frame of the to-be-detected face may be compared to the detection frame of the marked face to obtain a first loss value. The first loss value is configured to express a deviation between the detection frame of the to-be-detected face and the detection frame of the marked face.

For example, the first loss value may be determined correspondingly based on an equation 1 and an equation 2 in the following.

$$L_{cis}^{R} = -\log p_u \qquad \text{Equation 1}$$

The $$L_{cis}^{R}$$

represents a cross entropy loss and is configured to differentiate the face and the background for classification. The $P_u$ represents a probability that a predicted outcome is u when a to-be-distinguished object in a current sample image is u (such as 1 for face and 0 for background).

$$L_{loc} = \sum_{i \in \{x,y,w,h\}} \text{smooth}_{L1}(t_i - v_i) \qquad \text{Equation 2}$$

The $L_{loc}$ represents a loss of $\text{smooth}_{L1}$ and is configured to locate a face frame, $$\text{smooth}_{L1}(x) = \begin{cases} 0.5x^2 & \text{if } |x| < 1 \\ |x| - 0.5 & \text{otherwise} \end{cases},$$

the t represents a location of the detection frame of the to-be-detected face, and the v represents a location of the detection frame of the marked face.

In detail, a first loss value may be a sum a product of $$L_{cis}^{R}$$

and a weight corresponding to the $$L_{cis}^{R}$$

and a product of $L_{loc}$ and a weight corresponding to the $L_{loc}$.

In an operation c, the sample image is detected based on the predetermined multi-task management model to obtain predicted detection information, and the predicted detection information is compared to the information of whether the marked object is wearing the mask to obtain a second loss value. The second loss value represents a deviation between the predicted detection information and the information of whether the marked object is wearing the mask.

To be exemplary, the second loss value may be determined based on an Equation 3 as follows:

$$L_{cis}^{C} = -\log p_c \qquad \text{Equation 3}$$

The $$L_{cis}^{C}$$

represents a cross entropy loss and is configured to classify whether the object is wearing the mask or not. The $p_c$ represents a probability of a prediction outcome being c when the information of whether the object in the current sample image wearing the mask is c (for example, 1 for wearing the mask, and 0 for not wearing the mask).

In an operation d, the sample image is detected based on a predictive multi-task management model to obtain the predicted face feature point information, and the predicted face feature points are compared to marked face feature points to obtain a third loss value. The third loss value represents a deviation between the predicted face feature points and the marked face feature points.

To be exemplary, the third loss value may be determined based on an Equation 4 as follows:

$$L_{pts} = \sum_{i=1}^{n} \|l_i - l_i^*\|_2 \qquad \text{Equation 4}$$

The $L_{pts}$ represents a regression loss. The $l_i$ represents locations of the predicted feature points. The $$l_i^*$$

represents locations of the marked feature points. The n is the number of points.

In an operation e, the sample image is detected based on the predetermined multi-task management model to obtain a predicted region where the mask is worn, and the predicted region where the mask is worn is compared to the region where the marked object wears the mask to obtain a fourth loss value. The fourth loss value represents a deviation between the predicted region where the mask is worn and the region where the marked object wears the mask.

To be exemplary, the fourth loss value may be determined based on an Equation 5 as follows:

$$L_{cis}^{M} = \sum_{i=1}^{n} -\log p_m \qquad \text{Equation 5}$$

The $$L_{cis}^{M}$$

represents a cross entropy loss and is configured for differentiating a foreground region of the mask and a background region of the mask. The $p_m$ represents a probability of a predicted outcome being m when a current pixel label is m (for example, 1 representing the foreground region of the mask, and 0 representing the background region). The n represents the number of pixels.

In an operation f, an overall loss value is determined based on the first loss value and a weight corresponding to the first loss value, the second loss value and a weight corresponding to the second loss value, the third loss value and a weight corresponding to the third loss value, and the fourth loss value and a weight corresponding to the fourth loss value. Further, the predetermined multi-task management model is adjusted based on the overall loss value to obtain an adjusted multi-task management model.

To be exemplary, the overall loss value may be determined based on an Equation 6 as follows:

$$L = L_{cis}^{R} + \lambda_1 L_{loc} + \lambda_2 L_{pts} + \lambda_3 L_{cis}^{C} + \lambda_4 L_{cis}^{M} \qquad \text{Equation 6}$$

The $\lambda_1$ represents the weight corresponding to the $L_{loc}$. The $\lambda_2$ represents the weight corresponding to the $$L_{cis}^{C}.$$

The $\lambda_3$ represents the weight corresponding to the $L_{pts}$. The $\lambda_4$ represents the weight corresponding to the $$L_{cis}^{M}.$$

In an operation g, when it is determined that the overall loss value determined by the adjusted multi-task management model is in a predetermined range, the adjusted multi-task management model is taken as the trained multi-task management model.

According to the present disclosure, when the overall loss value is determined, the predetermined multi-task management model is adjusted based on the overall loss value to obtain the adjusted multi-task management model. The above operations are performed on the adjusted multi-task management model, until the overall loss value corresponding to the final determined adjusted multi-task management model is in the predetermined range. The adjusted multi-task management model is taken as the trained multi-task management model.

According to the present disclosure, after obtaining the trained multi-task management model by performing the above operations, the image to be detected may be detected based on the trained multi-task network model to obtain the region where the object wears the mask. Further, the area of the region where the object wears the mask is compared to a predetermined threshold to determine the first detection result. The first detection result is the object wearing the mask or the object not wearing the mask.

It may be seen that, according to the trained multi-task network model of the present disclosure, a plurality of tasks, such as face detection, face feature point detection, classification of the mask being worn or not worn, determination of the region where the object wears the mask, and the like, may be performed at one time. That is, compared to the traditional multi-stage cascade scheme, time consumed for detection by performing the method of the present disclosure is reduced dramatically. In addition, since the plurality of tasks are complementary to each other, performing one of the plurality of tasks may facilitate performing another one of the plurality of tasks, such that the effect of each task is improved, and the obtained first detection result may be more accurate.

In an operation 203, when it is determined that the object is wearing the mask, comparison information of a mask area to be compared is determined, and a target region corresponding to the comparison information in the image to be detected is determined based on a face feature point template. The comparison information represents information of a comparison region to be detected when the standardization of the mask wearing is performed. The face feature point template is determined based on the face region of the object.

According to the present disclosure, customized comparison criteria may be input and received. The comparison information of the mask region to be compared may be generated based on the customized comparison criteria. First feature point information corresponding to the comparison information is determined. Feature points that are identical to the first feature point information is screened from the face feature point template. The corresponding target region in the image to be detected is formed based on the feature points.

It can be seen that, in the embodiments of the present disclosure, the customized comparison criteria may be input based on actual demands. That is, the criteria for determining whether the mask is worn standardly may be modified based on the actual implementation accordingly, and may not be unique.

To be exemplary, the customized comparison criteria may be that a mask wearing region is a region from a person's chin to a root of a nose, or the mask wearing region is a region of the person's chin including the nose, or the mask wearing region is a region from a lower part of lips to the root of the nose. The present disclosure does not limit the mask wearing region.

According to the present disclosure, the comparison information of the mask area to be compared may be generated based on the customized comparison criteria that are determined previously. Further, the first feature point information corresponding to the comparison information is determined. The feature points that are identical to the first feature point information is screened from the face feature point template. The corresponding target region in the image to be detected is formed based on the feature points.

For example, as shown in FIG. 3, FIG. 3 is a schematic view of a target region according to an embodiment of the present disclosure. Feature points that are identical to the first feature point information are shown in FIG. 3 and include: feature points labeled as 2-16, 28-36, 49-68. A target region may be formed based on these feature points. In detail, the target region is an irregular closed polygon determined based on the feature points.

It can be seen that, according to the technical solution provided in the embodiments of the present disclosure, criteria of the mask wearing standard that are customized by the user may be supported. That is, the criteria of the mask wearing standard may be adapted to a variety of scenarios for mask wearing detection, expanding applicability of the technical solution.

In an operation 204, a second detection result is obtained based on the overlapping degree between the target region and the region where the object is wearing the mask. The second detection result includes the mask being worn non-standardly and the mask being worn standardly.

According to the present disclosure, an overlapping region between the target region and the region where the object wears the mask is determined. A ratio of the overlapping region to the target region is determined. The second detection result is determined to be the mask being worn standardly in response to the ratio being determined as not less than a predetermined threshold. The second detection result is determined to be the mask being worn non-standardly in response to the ratio being determined as less than the predetermined threshold.

To be exemplary, the ratio may be determined based on the Equation 7 as follows:

$$r = \frac{M \cap P}{P} \qquad \text{Equation 7}$$

The P represents the target region. The M represents the region where the object wears the mask. The r represents the ratio.

It can be seen that, in the embodiments of the present disclosure, based on the region where the object wears the mask and the predetermined polygon region, i.e., based on the technical solution for matching the overlapping area of the target region, a mis-determination caused by inaccurate determination of local information may be avoided, and standardization of the mask wearing may be determined more accurately.

Figure 4:
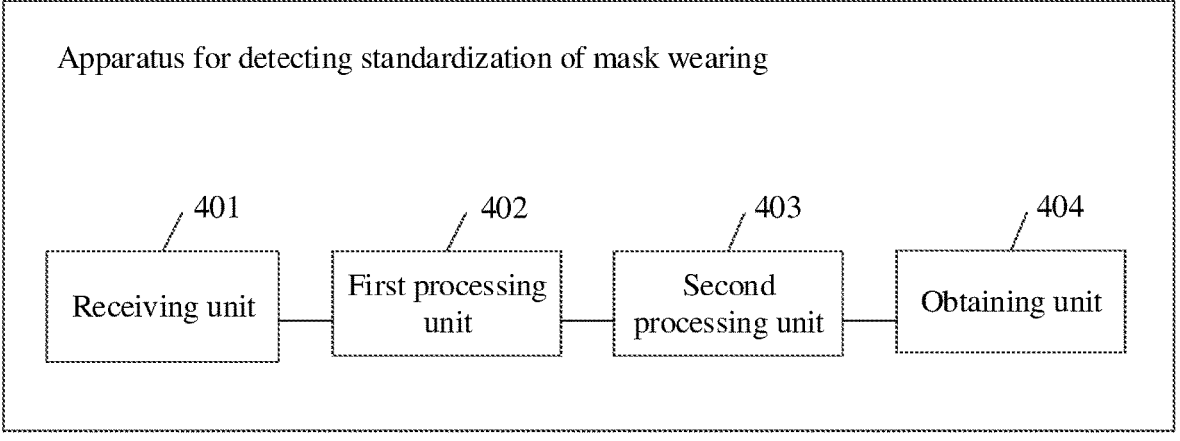
FIG. 4 is a structural diagram of a device for detecting standardization of mask wearing according to an embodiment of the present disclosure.

Based on a same concept, the present disclosure provides an apparatus for detecting standardization of mask wearing. The apparatus for detecting standardization of mask wearing may achieve functions corresponding to the above-mentioned method for detecting standardization of mask wearing. The apparatus for detecting standardization of mask wearing may be a hardware structure, a software module, or a hardware structure combining with a software module. The apparatus for detecting standardization of mask wearing can be achieved by a chip system. The chip system may be formed by a chip, or may include a chip and other discrete devices. As shown in FIG. 4, the apparatus for detecting standardization of mask wearing may include: a receiving unit 401, a first processing unit 402, a second processing unit 403 and an obtaining unit 404.

The receiving unit 401 is configured to receive an image to be detected. The image to be detected includes an object to be detected.

The first processing unit 402 is configured to: detect the image to be detected based on a trained multi-task network model to obtain an region where the object wears the mask; and compare an area of the region where the object wears the mask to a predetermined threshold to determine a first detection result. The first detection result is that the object is wearing the mask or that the object is not wearing the mask.

The second processing unit 403 is configured to: determine comparison information of a mask area to be compared when it is determined that the object is wearing the mask; and determine a target region corresponding to the comparison information in the image to be detected based on a face feature point template. The comparison information represents information of a comparison region to be detected when the standardization of mask wearing is detected. The face feature point template is determined based on a face region of the object.

The obtaining unit 404 is configured to obtain a second detection result based on an overlapping degree between the target region and the region where the object is wearing the mask. The second detection result includes the mask being worn non-standardly and the mask being worn standardly.

In an implementation, the second processing unit 403 is specifically configured to perform following operations.

The second processing unit 403 receives customized comparison criteria input by a user and generate the comparison information of the mask area to be compared based on the customized comparison criteria.

The second processing unit 403 determines first feature point information corresponding to the comparison information, screens feature points identical to the first feature point information from the face feature point template, and form a corresponding target region in the image to be detected based on the feature points.

In an implementation, the obtaining unit 403 is specifically configured to perform following operations.

The obtaining unit 403 determines an overlapping region between the target region and the region where the object wears the mask, and determines a ratio of the overlapping region to the target region.

The obtaining unit 403 determines the second detection result as the mask being worn standardly in response to the ratio being determined as not less than a predetermined threshold.

The obtaining unit 403 determines the second detection result as the mask being worn non-standardly in response to the ratio being determined as less than the predetermined threshold.

In an implementation, the apparatus for detecting standardization of mask wearing further includes a training unit configured to perform following operations.

The training unit determines a sample image to be trained. The sample image correspondingly includes a detection frame for a marked face, feature points for the marked face, a region where the marked object wears the mask, or information of whether the marked object wears the mask.

The training unit detects the sample image based on a predetermined multi-task management model to obtain a detection frame for a face to be detected, and compares the detection frame for the face to be detected to the detection frame for the marked face to obtain a first loss value. The first loss value represents a deviation between the detection frame for the face to be detected and the detection frame for the marked face.

The training unit detects the sample image based on the predetermined multi-task management model to obtain predictive detection information, and compares the predictive detection information to the information of whether the marked object is wearing the mask to obtain a second loss value. The second loss value represents a deviation between the predictive detection information and the information of whether the marked object is wearing the mask.

The training unit detects the sample image based on the predictive multi-task management model to obtain predicted face feature point information, and compares the predicted face feature points to the marked face feature points to obtain a third loss value. The third loss value represents a deviation between the predicted face feature points and the marked face feature points.

The training unit detects the sample image based on the predetermined multi-task management model to obtain a predicted region for wearing the mask, and compares the predicted region for wearing the mask to the region where the marked object wears the mask to obtain a fourth loss value. The fourth loss value represents a deviation between the predicted region for wearing the mask and the region where the marked object wears the mask.

The training unit determines an overall loss value based on the first loss value and a weight corresponding to the first loss value, the second loss value and a weight corresponding to the second loss value, the third loss value and a weight corresponding to the third loss value, and the fourth loss value and a weight corresponding to the fourth loss value, and adjusts the predetermined multi-task management model based on the overall loss value to obtain an adjusted multi-task management model.

The training unit takes the adjusted multi-task management model as the trained multi-task management model in response to the overall loss value determined by the adjusted multi-task management model being determined as in a predetermined range.

All relevant contents of the operations involved in the above-mentioned embodiments of the method for detecting standardization of mask wearing may be referred to the functional description of the functional modules corresponding to the apparatus for detecting standardization of mask wearing in the embodiment of the present invention, and will not be repeated here.

Division of the modules in the embodiments of the present disclosure is exemplary and is performed based on logical functions only. Other division may be performed in actual implementation. In addition, various functional modules in each embodiment of the present disclosure may be integrated in one controller or may be physically present separately. Alternatively, two or more functional modules may be integrated in one module. The above integrated modules may be implemented either in a form of hardware or in a form of software functional modules.

Figure 5:
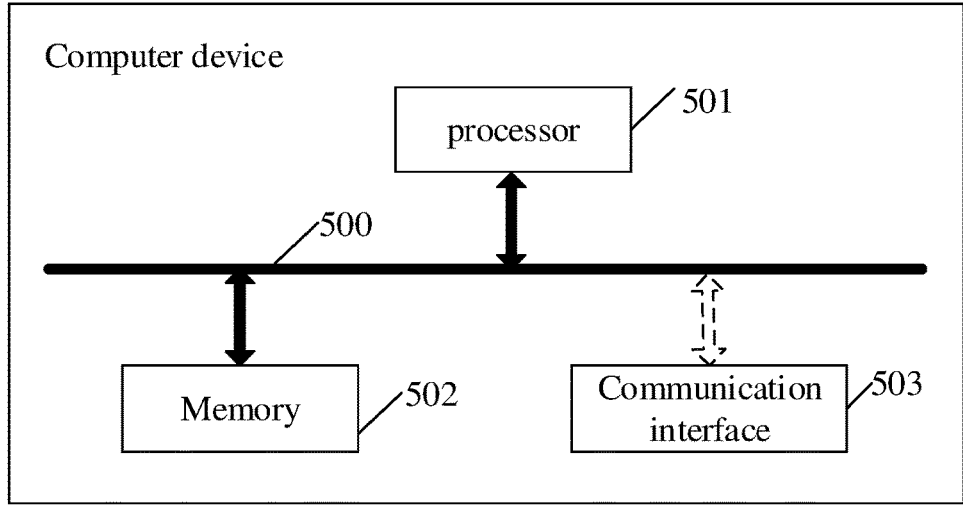
FIG. 5 is a structural schematic view of a computing device according to an embodiment of the present disclosure.

Based on a same concept, the present disclosure provides a computer device as shown in FIG. 5. The computer device includes at least one processor 501, and a memory 502 connected to the at least one processor. A specific connection medium between the processor 501 and the memory 502 is not limited by the embodiment of the present disclosure. FIG. 5 takes the processor 501 being connected to the memory 502 through a bus line 500 as an example. The bus line 500 is shown as a thick line in FIG. 5. Connection between other components is shown in FIG. 5 as schematic illustration only, and shall not be limited by the present disclosure. The bus line 500 may include an address bus, a data bus, a control bus, and the like. For concise representation, only a thick line is shown in FIG. 5, which does not mean that there is only one bus line or one type of bus. In addition, the apparatus for detecting standardization of mask wearing further includes a communication interface 503 for receiving or sending data.

According to the present disclosure, the memory 502 stores instructions executable by the at least one processor 501. The at least one processor 501 can perform the operations included in the above-mentioned method for detecting standardization of mask wearing by executing the instructions stored in the memory 502.

The processor 501 is a control center of the computer device and can connect various parts of the entire computer device using various interfaces and lines. The processor 501 may run or execute the instructions stored in the memory 502, invoke the data stored in the memory 502 and various functions, and process data of the computer device to monitor the computer device as a whole.

Alternatively, the processor 501 may include one or more processing units. The processor 501 may integrate an application processor and a modem processor. The application processor may substantially handle an operating system, user interfaces, and applications, and so on. The modem processor may substantially handle wireless communications. It will be understood that the modem processor may not be integrated into the processor 501. In some embodiments, the processor 501 and the memory 502 may be implemented on a same chip. In some embodiments, the processor 501 and the memory 502 may be implemented separately on separate chips.

The processor 501 may be a general purpose processor, such as a central processing unit (CPU), a digital signal processor, a specialized integrated circuit, a field programmable gate array or other programmable logic device, a discrete gate or transistor logic device, or a discrete hardware component, which can implement or perform the methods, the operations, and logic block diagrams disclosed in embodiments of the present disclosure. The general purpose processor may be a microprocessor or any conventional processor, and the like. The operations of the method disclosed in combination with the embodiments of the present disclosure may be directly implemented as being completed by a hardware processor or by a combination of hardware and software modules in the processor.

The memory 502 serves as a non-volatile computer readable storage medium that can be used to store non-volatile software programs, non-volatile computer executable programs, and modules. The memory 502 may include at least one of a storage medium, which may include, for example, a flash memory, a hard disk, a multimedia card, a card-type memory, a random access memory (RAM), a static random access memory (SRAM), a programmable read only memory (Programmable Read Only Memory (PROM), a Read Only Memory (ROM), an Electrically Erasable Programmable Read-Only Memory (EEPROM), a magnetic memory disk, a magnetic disk, an optical disk, and the like. The memory 502 is any other medium capable of carrying or storing desired program code in the form of instructions or data structures and capable of being accessed by a computer, but is not limited thereto. The memory 502 in embodiments of the present disclosure may also be a circuit or any other device capable of performing storage functions for storing program instructions and/or data.

By designing and programming the processor 501, codes corresponding to the method for detecting standardization of mask wearing in the above embodiments may be solidified into the chip, such that the chip can perform the operations of the above-mentioned method for detecting standardization of mask wearing when the chip is running. The ordinary skilled person in the art well knows how to design and program the processor 501, which will not be described hereinafter.

Base on the same concept, the present disclosure provides a computer-readable storage medium. The storage medium stores a computer program. When the computer program is executed by the processor, the operations of the method for detecting standardization of mask wearing as previously described may be achieved.

In some embodiments, various aspects of the method for detecting standardization of mask wearing provided by the present disclosure may also be implemented in the form of a program product. The program product includes program codes. When the program product is run on a control computer device, the program codes are configured to cause the control computer device to perform the operations in the method for detecting standardization of mask wearing according to various embodiments of the present disclosure as described in the above.

The ordinary skilled person in the art shall understand that, the embodiments of the present disclosure may be provided as a method, a system, or a computer program product. Therefore, the present disclosure may be implemented as a hardware embodiment, a software embodiment, or an embodiment combining software and hardware aspects. Further, the present disclosure may be implemented as a computer program product implemented on one or more computer usable storage media (including, but not limited to, disk memory and optical memory, and the like) containing computer usable program cods.

The present disclosure is described by referring to flowcharts and/or block diagrams of a method, a device (a system), and a computer program product according to embodiments of the present disclosure. It is to be understood that each operation and/or block in the flowchart and/or block diagram, and the combination of operations and/or blocks in the flowchart and/or block diagram, may be implemented by computer program instructions. These computer program instructions may be provided to a processor of a general purpose computer, a specialized computer, an embedded processor, or other programmable data processing devices to produce a machine, such that the instructions, which are executed by the processor of the computer or other programmable data processing device, produce a device for implementing the functions specified in one operation or multiple operations in the flowchart and/or one block or multiple blocks in the block diagram.

These computer program instructions may also be stored in a computer readable memory capable of directing a computer or other programmable data processing devices to operate in a particular manner such that the instructions that are stored in such computer readable memory produce a product including an instruction device that implements the function specified in one or more operations of the flowchart and/or one or more blocks of the block diagram.

These computer program instructions may also be loaded onto a computer or other programmable data processing devices, such that a series of operations are executed on the computer or other programmable devices to produce computer-implemented processes. In this way, the instructions executed on the computer or other programmable device provide the operations configured to perform the functions specified in one or more operations of the flowchart and/or one or more blocks of the block diagram.

Obviously, an ordinary skilled person in the art may perform various modifications and variations on the present disclosure without departing from the spirit and the scope of the present disclosure. In this way, if the modifications and variations of the present disclosure fall within the scope of the claims of the present disclosure and technical equivalents thereof, the present disclosure is also intended to cover such modifications and variations.

What is claimed is:

1. A method for detecting standardization of mask wearing, comprising:
   receiving an image to be detected, wherein the image to be detected comprises an object to be detected;
   detecting the image to be detected based on a trained multi-task network model to obtain a region where the object wears a mask;
   comparing an area of the region where the object wears the mask to a predetermined threshold to determine a first detection result, wherein the first detection result is that the object is wearing the mask or that the object is not wearing the mask;
   in response to the object being determined as wearing the mask, determining comparison information of a mask area to be compared, and determining a target region in the image to be detected corresponding to the comparison information based on a face feature point template, wherein the comparison information represents information of a comparison portion to be detected when standardization of mask wearing is detected, and the face feature point template is determined based on a face region of the object to be detected; and
   obtaining a second detection result based on an overlapping degree between the target region and the region where the object wears the mask, wherein the second detection result includes the mask being worn standardly and the mask being worn non-standardly;
   wherein the determining comparison information of a mask area to be compared, and the determining a target region in the image to be detected corresponding to the comparison information based on a face feature point template, comprise:

receiving input customized comparison criteria, generating the comparison information of the mask area to be compared based on the customized comparison criteria; and determining first feature point information corresponding to the comparison information; screening, from the face feature point template, feature points identical to the first feature point information; and forming the corresponding target region in the image to be detected based on the feature points;

wherein the target region is a closed polygon formed by connecting the feature points.

2. The method according to claim 1, wherein the obtaining a second detection result based on an overlapping degree between the target region and the region where the object wears the mask, comprises:

determining an overlapping region between the target region and the region where the object wears the mask, determining a ratio of the overlapping region to the target region;

determining the second detection result as the mask being worn standardly in response to the ratio being not less than a predetermined threshold; and determining the second detection result as the mask being worn non-standardly in response to the ratio being less than the predetermined threshold.

3. The method according to claim 1, wherein the multi-task management model is trained by following operations:

determining a sample image to be trained, wherein the sample image correspondingly comprises a detection frame of a marked face, marked face feature points, a region where a marked object wears the mask or information of whether the marked object wears the mask;

detecting the sample image based on a predetermined multi-task management model to obtain a predicted face detection frame, comparing the predicted face detection frame to the detection frame of the marked face to obtain a first loss value, wherein the first loss value represents a deviation between the predicted face detection frame and the detection frame of the marked face;

detecting the sample image based on the predetermined multi-task management model to obtain predictive detection information, comparing the predictive detection information to the information of whether the marked object is wearing the mask to obtain a second loss value, wherein the second loss value represents a deviation between the predictive detection information and the information of whether the marked object is wearing the mask;

detecting the sample image based on the predetermined multi-task management model to obtain predicted face feature point information, comparing the predicted face feature points to the marked face feature points to obtain a third loss value; wherein the third loss value represents a deviation between the predicted face feature points and the marked face feature points;

detecting the sample image based on the predetermined multi-task management model to obtain a predicted region where the mask is worn, comparing the predicted region where the mask is worn to the region where the marked object wears the mask to obtain a fourth loss value, wherein the fourth loss value represents a deviation between the predicted region where the mask is worn and the region where the marked object wears the mask;

determining an overall loss value based on the first loss value and a weight corresponding to the first loss value, the second loss value and a weight corresponding to the second loss value, the third loss value and a weight corresponding to the third loss value, and the fourth loss value and a weight corresponding to the fourth loss value, adjusting the predetermined multi-task management model based on the overall loss value to obtain an adjusted multi-task management model; and taking the adjusted multi-task management model as the trained multi-task management model in response to the overall loss value determined by the adjusted multi-task management model being determined as in a predetermined range.

4. A computer device, comprises a memory, a processor and computer programs stored in the memory and able to be run by the processor, wherein the computer programs, when being executed by the processor, are configured to implement the operations of:

receiving an image to be detected, wherein the image to be detected comprises an object to be detected;

detecting the image to be detected based on a trained multi-task network model to obtain a region where the object wears a mask;

comparing an area of the region where the object wears the mask to a predetermined threshold to determine a first detection result, wherein the first detection result is that the object is wearing the mask or that the object is not wearing the mask;

in response to the object being determined as wearing the mask, determining comparison information of a mask area to be compared, and determining a target region in the image to be detected corresponding to the comparison information based on a face feature point template, wherein the comparison information represents information of a comparison portion to be detected when standardization of mask wearing is detected, and the face feature point template is determined based on a face region of the object to be detected; and obtaining a second detection result based on an overlapping degree between the target region and the region where the object wears the mask, wherein the second detection result includes the mask being worn standardly and the mask being worn non-standardly;

wherein the determining comparison information of a mask area to be compared, and the determining a target region in the image to be detected corresponding to the comparison information based on a face feature point template, comprise:

receiving input customized comparison criteria, generating the comparison information of the mask area to be compared based on the customized comparison criteria; and determining first feature point information corresponding to the comparison information; screening, from the face feature point template, feature points identical to the first feature point information; and forming the corresponding target region in the image to be detected based on the feature points;

wherein the target region is a closed polygon formed by connecting the feature points.

5. The computer device according to claim 4, wherein, while obtaining the second detection result based on the overlapping degree between the target region and the region where the object wears the mask, the computer programs are further configured to implement the operations of:

determining an overlapping region between the target region and the region where the object wears the mask, determining a ratio of the overlapping region to the target region;

determining the second detection result as the mask being worn standardly in response to the ratio being not less than a predetermined threshold; and determining the second detection result as the mask being worn non-standardly in response to the ratio being less than the predetermined threshold.

6. The computer device according to claim 4, wherein the multi-task management model is trained by following operations:

determining a sample image to be trained, wherein the sample image correspondingly comprises a detection frame of a marked face, marked face feature points, a region where a marked object wears the mask or information of whether the marked object wears the mask;

detecting the sample image based on a predetermined multi-task management model to obtain a predicted face detection frame, comparing the predicted face detection frame to the detection frame of the marked face to obtain a first loss value, wherein the first loss value represents a deviation between the predicted face detection frame and the detection frame of the marked face;

detecting the sample image based on the predetermined multi-task management model to obtain predictive detection information, comparing the predictive detection information to the information of whether the marked object is wearing the mask to obtain a second loss value, wherein the second loss value represents a deviation between the predictive detection information and the information of whether the marked object is wearing the mask;

detecting the sample image based on the predetermined multi-task management model to obtain predicted face feature point information, comparing the predicted face feature points to the marked face feature points to obtain a third loss value; wherein the third loss value represents a deviation between the predicted face feature points and the marked face feature points;

detecting the sample image based on the predetermined multi-task management model to obtain a predicted region where the mask is worn, comparing the predicted region where the mask is worn to the region where the marked object wears the mask to obtain a fourth loss value, wherein the fourth loss value represents a deviation between the predicted region where the mask is worn and the region where the marked object wears the mask;

determining an overall loss value based on the first loss value and a weight corresponding to the first loss value, the second loss value and a weight corresponding to the second loss value, the third loss value and a weight corresponding to the third loss value, and the fourth loss value and a weight corresponding to the fourth loss value, adjusting the predetermined multi-task management model based on the overall loss value to obtain an adjusted multi-task management model; and taking the adjusted multi-task management model as the trained multi-task management model in response to the overall loss value determined by the adjusted multi-task management model being determined as in a predetermined range.

7. A non-transitory computer-readable storage medium, having computer programs stored therein, wherein the computer programs, when being executed by the processor, are configured to implement the operations of:

receiving an image to be detected, wherein the image to be detected comprises an object to be detected;

detecting the image to be detected based on a trained multi-task network model to obtain a region where the object wears a mask;

comparing an area of the region where the object wears the mask to a predetermined threshold to determine a first detection result, wherein the first detection result is that the object is wearing the mask or that the object is not wearing the mask;

in response to the object being determined as wearing the mask, determining comparison information of a mask area to be compared, and determining a target region in the image to be detected corresponding to the comparison information based on a face feature point template, wherein the comparison information represents information of a comparison portion to be detected when standardization of mask wearing is detected, and the face feature point template is determined based on a face region of the object to be detected; and obtaining a second detection result based on an overlapping degree between the target region and the region where the object wears the mask, wherein the second detection result includes the mask being worn standardly and the mask being worn non-standardly;

wherein the determining comparison information of a mask area to be compared, and the determining a target region in the image to be detected corresponding to the comparison information based on a face feature point template, comprise:

receiving input customized comparison criteria, generating the comparison information of the mask area to be compared based on the customized comparison criteria; and determining first feature point information corresponding to the comparison information; screening, from the face feature point template, feature points identical to the first feature point information; and forming the corresponding target region in the image to be detected based on the feature points;

wherein the target region is a closed polygon formed by connecting the feature points.

8. The non-transitory computer-readable storage medium according to claim 7, wherein, while obtaining the second detection result based on the overlapping degree between the target region and the region where the object wears the mask, the computer programs are configured to implement the operations of:

determining an overlapping region between the target region and the region where the object wears the mask, determining a ratio of the overlapping region to the target region;

determining the second detection result as the mask being worn standardly in response to the ratio being not less than a predetermined threshold; and determining the second detection result as the mask being worn non-standardly in response to the ratio being less than the predetermined threshold.

9. The non-transitory computer-readable storage medium according to claim 7, wherein the multi-task management model is trained by following operations:

determining a sample image to be trained, wherein the sample image correspondingly comprises a detection frame of a marked face, marked face feature points, a region where a marked object wears the mask or information of whether the marked object wears the mask;

detecting the sample image based on a predetermined multi-task management model to obtain a predicted face detection frame, comparing the predicted face detection frame to the detection frame of the marked face to obtain a first loss value, wherein the first loss value represents a deviation between the predicted face detection frame and the detection frame of the marked face;

detecting the sample image based on the predetermined multi-task management model to obtain predictive detection information, comparing the predictive detection information to the information of whether the marked object is wearing the mask to obtain a second loss value, wherein the second loss value represents a deviation between the predictive detection information and the information of whether the marked object is wearing the mask;

detecting the sample image based on the predetermined multi-task management model to obtain predicted face feature point information, comparing the predicted face feature points to the marked face feature points to obtain a third loss value; wherein the third loss value represents a deviation between the predicted face feature points and the marked face feature points;

detecting the sample image based on the predetermined multi-task management model to obtain a predicted region where the mask is worn, comparing the predicted region where the mask is worn to the region where the marked object wears the mask to obtain a fourth loss value, wherein the fourth loss value represents a deviation between the predicted region where the mask is worn and the region where the marked object wears the mask;

determining an overall loss value based on the first loss value and a weight corresponding to the first loss value, the second loss value and a weight corresponding to the second loss value, the third loss value and a weight corresponding to the third loss value, and the fourth loss value and a weight corresponding to the fourth loss value, adjusting the predetermined multi-task management model based on the overall loss value to obtain an adjusted multi-task management model; and taking the adjusted multi-task management model as the trained multi-task management model in response to the overall loss value determined by the adjusted multi-task management model being determined as in a predetermined range.

10. The method according to claim 1, wherein the target region is an irregular closed polygon.

\* \* \* \* \*